(12) United States Patent
Lange et al.

(10) Patent No.: US 10,241,231 B2
(45) Date of Patent: Mar. 26, 2019

(54) METHOD FOR EXPLOITING A FRACTURED MEDIUM ON THE BASIS OF A MATCHED RESERVOIR MODEL FOR WELLS CHOSEN BY MEANS OF AN EQUIVALENT TRANSMISSIVITY MODEL

(71) Applicant: IFP Energies nouvelles, Rueil-Malmaison (FR)

(72) Inventors: Arnaud Lange, Rueil-Malmaison (FR); Chakib Kada Kloucha, Suresnes (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 1121 days.

(21) Appl. No.: 14/283,722

(22) Filed: May 21, 2014

(65) Prior Publication Data

US 2014/0350902 A1    Nov. 27, 2014

(30) Foreign Application Priority Data

May 21, 2013    (FR) ..................... 13 54518

(51) Int. Cl.
*G01V 99/00*    (2009.01)
*E21B 49/00*    (2006.01)

(52) U.S. Cl.
CPC ............ *G01V 99/005* (2013.01); *E21B 49/00* (2013.01)

(58) Field of Classification Search
CPC .. G06F 17/5009; G06F 17/10; G06F 17/5018; G06F 2217/16; G06F 17/11; G06F 17/13; G01V 2210/646; G01V 2210/66; G01V 1/306; G01V 99/005; E21B 43/00; E21B 49/00; E21B 43/17; E21B 43/12; E21B 43/14; E21B 44/00

USPC ........................................................ 703/2, 10
See application file for complete search history.

(56) References Cited

U.S. PATENT DOCUMENTS

| | | | |
|---|---|---|---|
| 5,661,698 A | 8/1997 | Cacas | |
| 5,798,768 A | 8/1998 | Cacas et al. | |
| 6,023,656 A | 2/2000 | Cacas et al. | |
| 6,662,109 B2* | 12/2003 | Roggero | G01V 11/00 702/6 |
| 6,922,662 B2 | 7/2005 | Manceau et al. | |
| 2002/0016702 A1 | 2/2002 | Manceau et al. | |
| 2003/0216898 A1* | 11/2003 | Basquet | E21B 49/00 703/10 |

FOREIGN PATENT DOCUMENTS

CA    2348804    7/2011

OTHER PUBLICATIONS

Lange et al. "A Multimode Inversion Methodology for the Characterization of Fractured Reservoirs from Well Test Data", SPE 143518, SPE EUROPEC/EAGE Annual Conference and Exhibition held in Vienna, Austria, May 23-26, 2011, pp. 1-13.*

(Continued)

*Primary Examiner* — Aniss Chad
*Assistant Examiner* — Justin C Mikowski
(74) *Attorney, Agent, or Firm* — Fitch, Even, Tabin & Flannery LLP

(57) ABSTRACT

The present invention relates to a method (EXP) for exploiting a subterranean medium by means of a fractured reservoir model. The fractured reservoir model is matched (CAL) for a set of chosen wells (CHO), for which the measured dynamic data (DD) correspond to the estimated dynamic data by means of an equivalent transmissivity model (MOD).

18 Claims, 4 Drawing Sheets

(56) References Cited

OTHER PUBLICATIONS

Lange, Arnaud G: "Assisted History Matching for the Characterization of Fractured Reservoirs," AAPG Bulletin, vol. 93, No. 11, Nov. 1, 2009, pp. 1609-1619, XP009175654.
Schildberg, Y., et al: "Integraton of Geostatistics and Well Test to Validate a Priori Geological Models for the Dynamic Simulation," SPE International, Oct. 8, 1997, pp. 491-505, XP055098402.
Bruyelle, Jeremie, et al: "Automated Characterization of Fracture Conductivities from Well Tests Inversion," SPE 121172, Copyright 2009, Society of Petroleum Engineers, Jun. 8-11, 2009, 14 pages.
Lange, Arnaud, et al: "A Multimode Inversion Methodology for the Characterizaton of Fractured Reservoirs from Well Test Data," SPE 143518, Copyright 2011, Society of Petroleum Engineers, May 23-26, 2011, 14 pages.
Kloucha, Dr. Chakib Kada, et al: "Genetic-based Characterization of Fractured Reservoirs from Interpreted Well Tests," SPE 160936-PP, Copyright 2012, Society of Petroleum Engineers, Nov. 11-14, 2012, 8 pages.

\* cited by examiner

METHOD FOR EXPLOITING A FRACTURED MEDIUM ON THE BASIS OF A MATCHED RESERVOIR MODEL FOR WELLS CHOSEN BY MEANS OF AN EQUIVALENT TRANSMISSIVITY MODEL

BACKGROUND OF THE INVENTION

Field of the Invention

The present invention relates to the exploitation of a subterranean medium, such as an oil reservoir. More particularly, the invention relates to a method of history matching of a geological model representing a subterranean reservoir, in which the geometry of a network of faults is adjusted in order to reproduce the observed data by simulation.

Description of the Prior Art

The study of a subterranean medium, notably an oil field, requires the construction of models, broadly known as "geological models". These models, which are well-known and widely used in the oil industry, make possible determination of many technical parameters related to the research such as study or exploitation of a reservoir of hydrocarbons for example, Indeed, a geological model represents the structure of the reservoir as well as its behavior. It is thus possible for example to determine the zones that have the best chance of containing hydrocarbons, the zones in which it can be advantageous and/or necessary to drill an injection well to improve the recovery of hydrocarbons, the type of tools to use, the properties of the fluids used and recovered, etc. These interpretations of geological models in terms of "technical parameters of exploitation" are well known, even if new methods are regularly developed. It is therefore crucial, in the sector of exploration for oil, to construct as precise a model as possible. To do this, the integration of all the available data is indispensable.

A geological model (or a reservoir model) constitutes a model of the subsoil, representing both its structure and behavior. Generally, this type of model is represented on a computer, and the term numerical model is then used to describe the model.

Hydrocarbon reservoirs are generally a very heterogeneous and fractured porous media. To obtain the best possible image of the reservoir, it is therefore necessary, in addition to the static and dynamic data, to incorporate faults, also called fractures.

A fault (or a fracture) is a surface generated by a shear break separating the rock by creating a throw between two adjacent blocks. Three types of fault (the term "family of fractures", that is sets of fractures with a same geological origin, is used) can be discerned in a reservoir. Seismic faults are large objects visible on seismic probes. These are objects of large size (of several hundreds of meters to several kilometers). Seismic faults can be modeled explicitly, that is non-stochastically. Sub-seismic faults are objects, having a size which is not large enough for them to be visible on seismic images. This involves fracturing at a very variable scale (in the order of the meter to the kilometer). This type of fracture can be modeled by stochastic methods. Diffuse faults correspond to fracturing on a small scale (on the order of the meter) and can be modeled by stochastic methods that is by a set of distribution law parameters.

The so-called "fractured geological model" (or reservoir model) is a representation of the subterranean medium, in which the geometry of the faults is generally represented by Boolean objects. In two dimensions, the faults are represented by outlines, and in three dimensions by surfaces. Properties such as porosity, permeability, effective opening, etc. are associated with each object.

Seismic faults are added deterministically, as they are seen by seismics. Sub-seismic and diffuse faults that are invisible are added by so-called "probabilistic" construction methods due to the limitations of the information available (restricted number of wells etc.) Due to this, the geological models (or reservoir models) built from these probabilistic methods are called "stochastic models".

Generally, the integration of fracture properties is carried out in two steps: (1) a first phase of integration describes the geometrical properties of the fractures (density, length etc.); (2) a second phase of integration describes the dynamic properties of the fractures (permeability etc.) For example, U.S. Pat. Nos. 6,023,656, 5,659,135, 5,661,698, 6,922,662, and 5,798,768, US published application 2002/0016702, and application CA 2,348,804 describe methods comprising these two steps.

The characterization of the geometrical properties of fractures is carried out via the integration of seismic data (for seismic faults) and well data. However, integration is difficult because the data are often incomplete or not very precise, and large uncertainties generally remain regarding the estimates of the geometrical properties of fractures. In particular, the length of the fractures below the seismic scale is very difficult to estimate. This type of method is described in the document: Lange A., "*Assisted History-Matching for the Characterization of Fractured Reservoirs*", AAPG Bulletin, vol. 93, no. 11, pp. 1609-1619 (November 2009).

The integration of dynamic data such as well tests makes it possible to reduce the uncertainties on the estimation of the geometrical properties of fractures and characterizing the flow properties of fractures, as is shown from: Bruyelle, J. and Lange, A. 2009. *Automated Characterization of Fracture Conductivities from Well Tests Inversion*. SPE 121172, and Lange, A. and Bruyelle, J. 2011. *A Multimode Inversion Methodology for the Characterization of Fractured Reservoirs from Well Test Data*. SPE 143518. This integration is for example carried out via a flow simulation on discretized models of fault networks, while seeking to match the transient well test curves. However, this approach is very expensive in terms of computing time.

Another much faster approach, is to estimate the equivalent flow properties of the fracture networks via simplified physical models, and to match only the equivalent transmissivity estimated on the basis of well test data. This approach is described in the following: Kada Kloucha C. and Lange A., "*Genetic-based Characterization of Fractured Reservoirs from Interpreted Well Tests*", SPE 160936 (2012) and Lange A., "*Assisted History-Matching for the Characterization of Fractured Reservoirs*", AAPG Bulletin, vol. 93, no. 11, pp. 1609-1619 (November 2009). For this approach, the matching is carried out by using an optimization algorithm seeking to minimize the error between the observed equivalent transmissivity and the simulated equivalent transmissivity.

The following difficulties remain, however:
the uncertainties affecting the fracture properties are so large that the research space that an optimizer must explore is very vast, reducing the chances of matching the observed data in a satisfactory way, and therefore of obtaining a reliable geological model; and
the observed data are sometimes uncertain (measurement errors), but this uncertainty is difficult to estimate. This situation is difficult for the optimizer to handle, which will still attempt to find compromise solutions that match all the data as well as possible, whether or not they are reliable, and these compromise solutions are often unsatisfactory.

SUMMARY OF THE INVENTION

To lessen these problems, the present invention relates to a method for exploiting a subterranean medium by use of a fractured reservoir model. The fractured reservoir model is matched for a set of chosen wells, for which the measured dynamic data correspond to dynamic data estimated by use of an equivalent transmissivity model. The method according to the invention allows effective integration of the dynamic data to characterize geological "fractured reservoir" models, by handling the uncertainties affecting the fracture properties and the measurement errors on the dynamic well data.

The invention relates to a method for exploiting a fractured subterranean medium based on a fractured reservoir model including a set of meshes discretizing the subterranean medium. The fractures are characterized by at least one fracture property, for which a range of variation of the property is defined, and the subterranean medium is passed through by at least two wells.

A method using at least one equivalent transmissivity is determined for each well. For this method, the following steps are performed:
a) for each well an equivalent transmissivity model is constructed which links the equivalent transmissivity to the fracture property;
b) an equivalent transmissivity spectrum is estimated for each well by using the equivalent transmissivity model and a range of variation of the fracture property;
c) at least one well is chosen for which the determined equivalent transmissivity lies within the equivalent transmissivity spectrum;
d) an initial fractured reservoir model is generated by use of the fracture property and the initial fractured reservoir model is matched by varying the property within the range of variation for each well that is chosen, to minimize a difference between the measured data and the data simulated by use of the fractured reservoir model and a flow simulator; and
e) exploiting the subterranean medium according to an exploitation scheme defined based on the matched fractured reservoir model.

According to the invention, after the step of choosing the well, the range of variation of the property is modified as a function of a comparison between the equivalent transmissivity spectrum and the determined equivalent transmissivity and the step of matching the fractured reservoir model is performed by varying the property within the modified range of variation.

Advantageously, the equivalent transmissivity is determined for each well by means of well test data.

Advantageously, the at least one fracture property is chosen from among average fracture density, average fracture conductivity, average fracture opening, average fracture length and height and average fracture orientation.

Preferably, the at least one fracture property varies for each cell of the fractured reservoir model, for each facies, or for each zone of the subterranean medium.

According to the invention, the equivalent transmissivity model is an analytical model.

According to an embodiment of the equation defining the analytical equivalent transmissivity model, the analytical equivalent transmissivity model is written by a formula of the form: $KH^S = C_0 [1+\alpha_1 \cdot \theta_{d,1}]^{\omega(1,1)} \cdot [1+\beta_1 \cdot \theta_{c,1}]^{\omega(1,2)} \ldots [1+\alpha_S \cdot \theta_{d,S}]^{\omega(S,1)} \cdot [1+\beta_S \cdot \theta_{c,S}]^{\omega(S,2)}$ with S is the number of fracture families that are considered, $\theta_{d,j}$ and $\theta_{c,j}$ normalized properties associated with density and conductivity of fracture family j respectively, $\alpha_j$ and $\omega(j,1)$ are weighting coefficients representing a contribution of density of the fracture family j to an estimate of the equivalent transmissivity KH, similarly, $\beta_j$ and $\omega(j,2)$ are weighting coefficients representing a contribution of the conductivity of the fracture family j to the estimate of KH, and $C_0$ is a corrective coefficient, independent of the fracture properties.

Advantageously, the initial fractured reservoir model is generated by use of a property determined by use of the model.

Preferably, the range of variation of the property is defined by means of measurements and uncertainties related to these measurements.

Advantageously, the reservoir model is matched by minimizing a difference between measured dynamic data and simulated dynamic data, particularly between measured equivalent transmissivities and simulated equivalent transmissivities.

The invention furthermore relates to a computer program product downloadable from a communication network and/ or stored on a tangible data storage medium readable by a computer and/or executable by a processor, comprising program code instructions for implementing the method according to the invention, when said program is executed on a computer.

BRIEF DESCRIPTION OF THE DRAWINGS

Other features and advantages of the method according to the invention will become apparent upon reading the following description of non-limiting exemplary embodiments, with reference to the figures appended and described below.

DETAILED DESCRIPTION OF THE INVENTION

The invention relates to a method for exploiting a subterranean medium, notably a hydrocarbon reservoir. The term "hydrocarbons" should be understood, within the meaning of the present invention, to mean oil-bearing products such as oil or crude oil, petrol or extra-heavy oil, asphaltenic sands, bituminous schists and gases present in a subterranean formation. The method according to the invention is also adapted to the exploitation of gas storage reservoirs, containing gases such as $CO_2$.

The subterranean medium is fractured (or faulted) and is passed through by at least one well for its exploitation which can involve injection wells and/or production wells.

The method of exploitation according to the invention is based on the use of a reliable fractured reservoir model, matched using an integration of dynamic data, notably the equivalent transmissivity, denoted KH.

Figure 1:
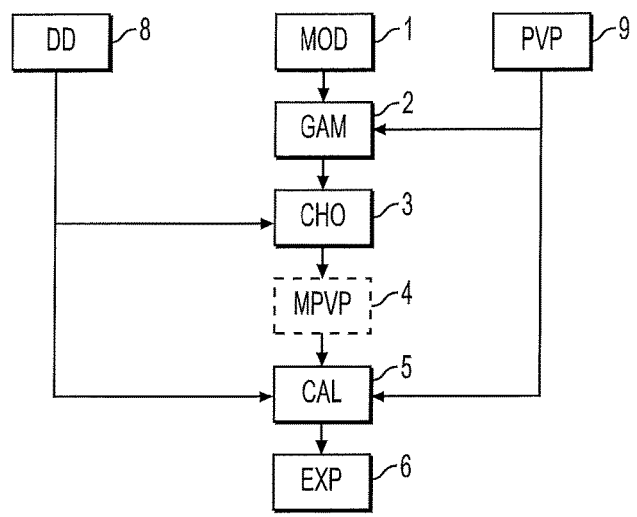
FIG. 1 illustrates the various steps of the method according to the invention.

FIG. 1 represents the steps of the method according to the invention:

1) constructing an equivalent transmissivity model (MOD)
2) estimating an equivalent transmissivity spectrum (GAM)
3) choosing wells for matching (CHO)
4) modifying the range of variation of the fracture properties (MPVP)
5) matching the fractured reservoir model (CAL)
6) exploiting the subterranean medium (EXP).

The step 4) of modifying the range of variation of the fracture properties (MPVP) is an optional step making it possible to reduce the computing time during matching (CAL).

The method according to the invention allows an integration of dynamic data (DD)8 for the fractured reservoir model. This dynamic data (DD) is specifically the equivalent transmissivity KH. The equivalent transmissivity designates the product K·H, where K designates the equivalent permeability of the fractured porous medium and H the equivalent reservoir height over which the permeability is estimated.

The equivalent transmissivity is determined for each well passing through the subterranean medium. This quantity can be estimated based on (measured) data from the well tests. The wells and the associated data that are considered for dynamic integration are specified. For example, for each well Pi one may consider the equivalent transmissivity (KH)i estimated on the basis of well tests, where i varies from 1 to N, and N is the number of wells.

It should be noted that there are three families of fractures (i.e. a set of fractures of same geological origin) in a reservoir with the seismic fractures being large objects visible on the seismic probes, the sub-seismic fractures which are objects with a size not large enough to be visible on seismic images, and diffuse fractures corresponding to fracturing on a small scale.

Moreover, the fractures are characterized by at least one property, called the "fracture property". Fracture properties can depend on the family of fractures. These fracture properties are, for example (non-exhaustive list):

the mean fracture density for a given family,
the mean fracture conductivity for a given family,
the mean fracture opening for a given family,
the mean fracture length and height for a given family, and
the mean fracture orientation for a given family.

It should be noted that these properties can vary by facies, by grid cell or by zone, in order to allow for localized characterization. Alternatively, the fracture properties can be constant over the whole medium.

A range of variation of each fracture property (PVP)9, also called "research space", is defined for the properties of uncertain fractures that have to be characterized by the integration of dynamic data. It is in fact a question of defining, for each fracture property, an interval of values in which solutions are sought that will be required to reproduce the dynamic data as well as possible. The range of variation of each property can be determined as a function of physical measurements of the subterranean medium, and as a function of uncertainties related to these measurements. These ranges of variation can be determined by an expert as a function of this knowledge.

1) Constructing an Equivalent Transmissivity Model (MOD)

An equivalent transmissivity model is a model that makes possible estimating equivalent transmissivity. This model relates equivalent transmissivity to fracture properties and depends on families of fractures. It can be analytical.

Given that the properties of the rock and/or the fractures generally vary from one well to another, the equivalent transmissivity, measured by a well test for example, also varies from one well to another. It is therefore proposed to construct an approximate model (analytical, for example) for each well, making it possible to estimate the equivalent transmissivity on the basis of the fracture properties.

It has already been demonstrated that it was possible to construct reliable, analytical approximate models in order to estimate equivalent transmissivity based on certain fracture properties. According to an embodiment of the invention, for which the fracture properties being considered are the fracture density and conductivity, the analytical models can use the following general formulation:

$$KH^S = C_0[1+\alpha_1 \cdot \theta_{d,1}]^{\omega(1,1)} \cdot [1+\beta_1 \cdot \theta_{c,1}]^{\omega(1,2)} \ldots [1+\alpha_S \cdot \theta_{d,S}]^{\omega(S,1)} \cdot [1+\beta_S \cdot \theta_{c,S}]^{\omega(S,2)}$$

where S is the number of fracture families being considered, $\theta_{d,j}$ and $\theta_{c,j}$ are normalized properties associated with the density and conductivity of the fracture family j, respectively, $\alpha_j$ and $\omega(j,1)$ are weighting coefficients representing the contribution of the density of the fracture family j to the estimate of the equivalent transmissivity KH, similarly, $\beta_j$ and $\omega(j,2)$ are weighting coefficients representing the contribution of the conductivity of the fracture family j to the estimate of KH, and finally $C_0$ is a corrective coefficient, independent of the fracture properties. This formulation is a generalization of the usual geometrical mean.

The document Lange, A. and Bruyelle, J. 2011. *A Multimode Inversion Methodology for the Characterization of Fractured Reservoirs from Well Test Data*, SPE 143518 describes such an analytical model of equivalent transmissivity.

According to a second embodiment of the invention, for which the fracture properties which are considered are the fracture density and conductivity, an analytical model can be expressed by a formula of the following form:

$$KH = [A_1 + A_2 * \theta_d][B_1 + B_2 * \theta_c]$$

where the parameter $\theta_d$ is a property associated with the fracture density that varies in the interval [0,1], and which causes the densities of each family and facies to vary simultaneously, via: $d(i,j) = dmin(i,j) + \theta_d*(dmax(i,j) - dmin(i,j))$, for the set i and facies j, for example. In a similar manner the property $\theta_c$ associated with the fracture conductivity causes the conductivities of each fracture family to vary. The equivalent transmissivity model is constructed based on any four simulations, in order to determine the coefficients $A_1$, $A_2$, $B_1$, $B_2$.

These models therefore make it possible to estimate, for given parameters of fracture density and conductivity, the corresponding equivalent transmissivity KH. It is only an approximation, and not an exact formula.

2) Estimating an Equivalent Transmissivity Spectrum (GAM)

Equivalent transmissivity models are used to estimate whether or not a solution exists in the "research space" (the range of variation of the fracture parameters (PVP))9) being considered. To do this, the extreme values of the equivalent transmissivity KH in the research space are estimated by use of the model. On the basis of the extreme values, an equivalent transmissivity spectrum is defined for each well. This spectrum encompasses all the values that the equivalent transmissivity estimated by use of the model for the whole range of variation of the properties.

3) Choosing Wells (CHO)

In this step, the wells are chosen for which the history matching will be implemented. For each well, it is verified whether or not the determined (measured) equivalent transmissivity KH lies within the equivalent transmissivity spectrum estimated over the range of variation of the fracture properties. There are then two alternatives:

For each well, the measured equivalent transmissivity KH lies within the equivalent transmissivity spectrum estimated over the research space. In this case, at least one solution exists allowing all the equivalent transmissivities KH to be matched for all the wells, so all the wells are chosen to perform the matching.

There is at least one well for which the measured equivalent transmissivity KH does not lie within the equivalent transmissivity spectrum estimated over the research space. In this case, either the research space is not large enough, and it can be modified to limit all the measured equivalent transmissivities KH for all the wells, or the measured equivalent transmissivity KH is not reliable (for example: a measurement error) and a tolerance can be considered for the matching.

The equivalent transmissivity models are then used to estimate one or more solutions over the research space, which can serve as initial estimates for the optimization algorithm used for the matching. There are however two alternatives:

No solution exists making it possible to match all the equivalent transmissivities KH for all the wells. In this case, the solution is chosen that makes possible matching a maximum of equivalent transmissivity KH data, and the minority of wells that do not have any equivalent transmissivity KH compatible with the solution are ignored.

A common solution exists making possible matching all the equivalent transmissivities KH for all the wells which is used as initial estimation in the optimization algorithm used for the matching.

Figure 2:
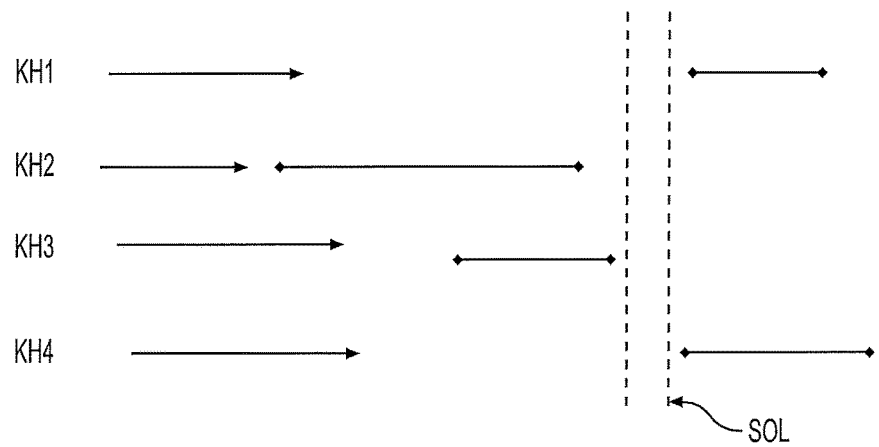
FIG. 2 illustrates the equivalent transmissivity estimated for four wells as well as a solution according to a method of the prior art.
Figure 3:
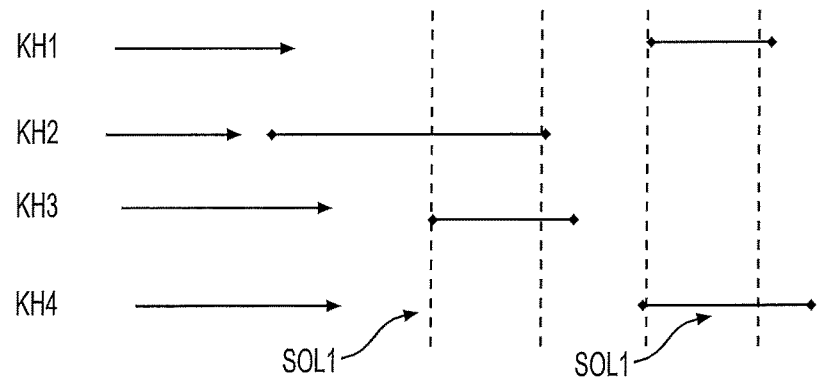
FIG. 3 illustrates a matching process for the example in FIG. 2 according to the method according to the invention.

FIGS. 2 and 3 illustrate equivalent transmissivity spectra estimated for an example with four wells for a method of the prior art and the method according to the invention respectively. In these figures, the bold horizontal segments indicate the equivalent transmissivity spectra estimated by use of a model for the four wells KH1, KH2, KH3 and KH4 and the vertical dots limit a determined solution (SOL) for matching the wells. For this example, no solution exists making possible matching all the equivalent transmissivities for all the wells. For the prior art (FIG. 2), the compromise solution, arranged between the ranges of variation of the KH of the four wells, is not reliable and does not correspond to any of the estimated equivalent transmissivity spectra. According to the invention (FIG. 3), the method chooses a set of wells for which a solution exists making it possible to match all the wells of this set. For this example, the wells 2 and 3 may be chosen according to the solution 1 (SOL 1), or the wells 1 and 4 according to the solution 2 (SOL 2).

Figure 4:
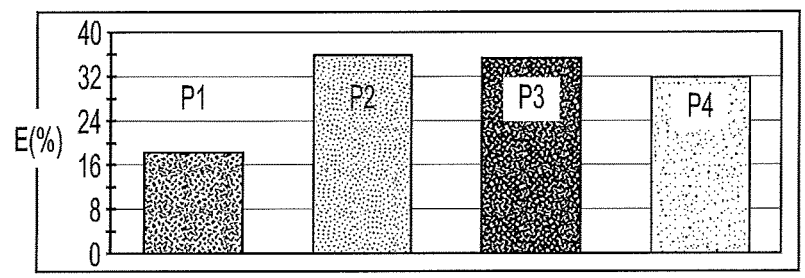
FIG. 4 illustrates, for an example, an error between the estimated equivalent transmissivity and the measured equivalent transmissivity for a method of the prior art.
Figure 5:
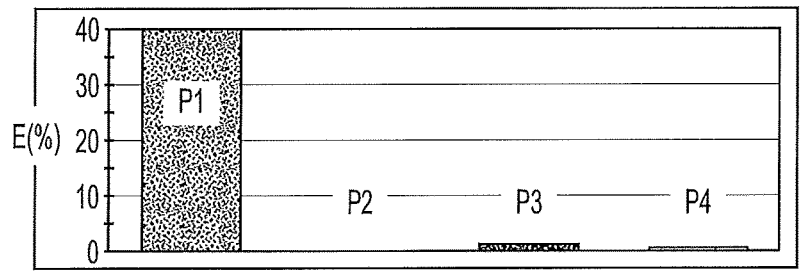
FIG. 5 corresponds to FIG. 4 for the method according to the invention.

FIGS. 4 and 5 illustrate the error E (%) as a function of the wells (P1 to P4) for another exemplary application where no common solution exists making possible matching all the equivalent transmissivities for a method of the prior art and for the method according to the invention respectively. For the prior art (FIG. 4), the compromise solution is not reliable and the matching error remains significant (between 16 and 36%) for all the wells. According to the invention (FIG. 5), the method chooses the wells P2, P3 and P4 for the matching, the matching is very reliable for these wells (error below 2%) and significant for P1 (about 40%).

The step of choosing the wells therefore makes it possible to improve the reliability of the method, in particular for cases where no common solution can be determined.

4) Modifying the Range of Variation of the Fracture Properties (MPVP)

This optional step makes it possible to reduce the computing time for matching while limiting the extent of the ranges of variation of the fracture properties. To do this, the research space (the ranges of variation of the fracture properties) is updated by reduction to intervals containing solutions estimated by the equivalent transmissivity model.

The well data can also be reduced so that it is possible to define a satisfactory solution for a maximum of wells and/or for a selection of a particular well.

For example, based on solution 1 in FIG. 3, the equivalent transmissivity spectra KH2 and KH3 can be limited to the limits of solution 1. Then, by use of the model, the ranges of variation of the fracture properties resulting in these spectra are deduced.

Thus, when matching the fractured reservoir model, the fracture properties are modified to a reduced range of variation, which reduces the number of possibilities of each fracture property. Therefore, the number of iterations used for the matching and consequently the computation time is also reduced.

5) Matching the Fractured Reservoir Model (CAL)

In this step, an initial fracture reservoir model is generated, for example geostatistically on the basis of static data, seismic data, fracture properties and their ranges of variation (modified or not) for the chosen wells. Advantageously, the initial fractured reservoir model is generated by use of a determined property by use of the model.

Next, the fractured reservoir model is matched by use of an optimization algorithm by varying the properties inside their ranges of variation (modified or not), to minimize a difference between the measured dynamic data and the dynamic data simulated by use of the fractured reservoir model and a flow simulator. According to an embodiment of the invention, the dynamic data being considered are the KHs.

A reservoir simulation is a technique which simulates the fluid flow inside a reservoir by use of a software package called a "flow simulator", and the "reservoir model". For example, the software package PumaFlow® (IFP Énergies nouvelles, France) is a flow simulator.

FIGS. 6 and 7 represent the results of a matching process for an exemplary application where the ranges of variation of the fracture properties are vast for a matching method of the prior art and for a method according to the invention respectively.

Figure 6A:
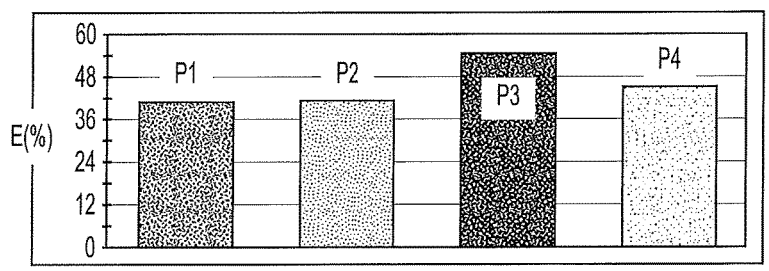
FIG. 6a illustrates, for an example, an error between the estimated equivalent transmissivity and the measured equivalent transmissivity for a matching method of the prior art.
Figure 7A:
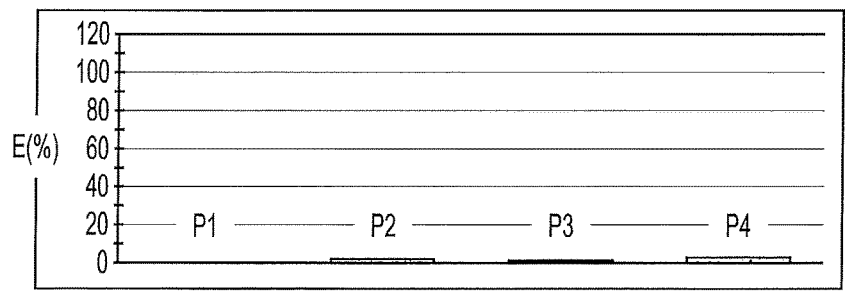
FIGS. 7a and 7b correspond to FIGS. 6a and 6b for the method according to the invention.

FIGS. 6a and 7a illustrate the error E (%) as a function of the wells (P1 to P4). For the prior art (FIG. 6a), the compromise solution is not reliable, the matching error remains considerable (between 40 and 54%) for each well.

According to the invention (FIG. 7a), the method chooses a satisfactory solution by using the model. At the end of the matching process, the error is low for the four wells.

Figure 6B:
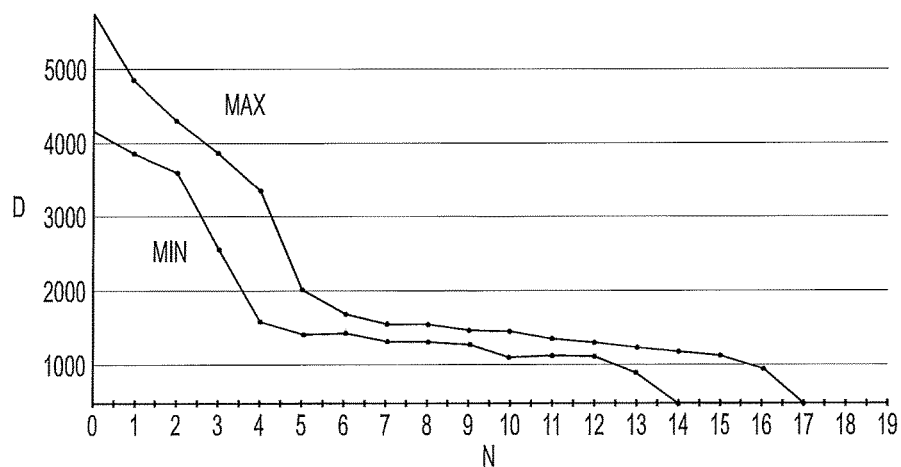
FIG. 6b illustrates, for the example in FIG. 6a, the variation in the error over the iterations of the matching process for a method of the prior art.
Figure 7B:
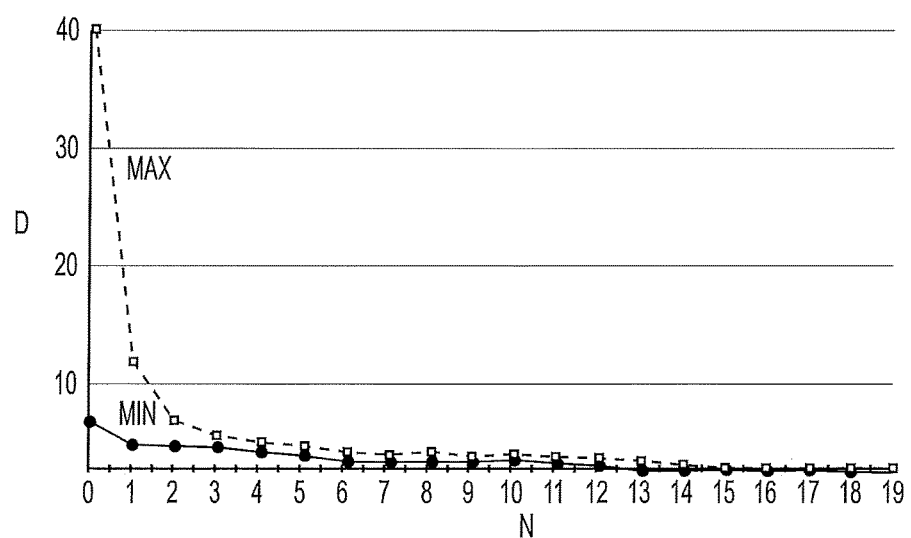

FIGS. 6b and 7b represent the difference D between the measured dynamic data and the simulated dynamic data as a function of the number N of iterations of the matching method. For the prior art (FIG. 6b), the minimum (Min) and maximum (Max) differences remain very high; a dozen iterations are necessary to obtain a difference D below 1000. Whereas, according to the invention (FIG. 7b), the difference has a value of 40 from the first iteration.

Consequently, the method according to the invention makes it possible to determine a more reliable fractured reservoir model by reducing the computing time.

6) Exploiting the Subterranean Medium (EXP)

Based on the fractured reservoir model determined and matched in the preceding steps, a plurality of exploitation schemes can be determined corresponding to various possible configurations of exploitation of the subterranean reservoir including placing of the production and/or injection wells, the target values for the flow rates by well and/or for the reservoir, the type of tools to be used, fluids to be used, injected and/or recovered etc. For each of these schemes, it is advisable to determine the production previsions after the matching period. These probabilistic production previsions are obtained by use of a flow simulation software package (preferably the same as that used beforehand) as well as by means use of the numerical model of a matched fractured reservoir.

One or more possible exploitation schemes are defined that are adapted to the fractured reservoir model (also called geological model). For each of these schemes, the responses are determined by simulation.

Based on probabilistic production previsions defined for each exploitation scheme, the exploitation scheme can be chosen that seems most relevant to them. For example:
  by comparing the maximum of the volume of oil recovered, it is possible to determine the production schema which is liable to supply the maximum of recovery or to be most profitable.
  by comparing the standard deviation of the volume of oil recovered, it is possible to determine the least risky production scheme.

The reservoir is then exploited according to the exploitation scheme defined for example by drilling new wells (production or injection), by modifying the tools to be used, by modifying the flow rates and/or the nature of the fluids injected etc.

The method according to the invention is applicable in the field of hydrocarbon recovery, and in the field of $CO_2$ storage.

The invention is a method for exploiting a fractured subterranean medium to produce hydrocarbons from the fractured medium which uses a fractured reservoir model including a set of meshes discretizing the fractured reservoir medium, the fractures of the subterranean medium being characterized by at least one fracture property, for which a range of variation of the at least on fracture property is defined, at least two wells passing through the subterranean medium and determining at least one equivalent transmissivity from well test data for each well comprising constructing an equivalent transmissivity model for each well which links the at least one equivalent transmissivity for each well to the at least one fracture property; using at least one transmissivity model and the range of variation of the at least one fracture property to estimate an equivalent transmissivity spectrum for each well; choosing at least one well for which the at least one equivalent transmissivity lies within the equivalent spectrum and modifying the range of variation of the at least one fracture property as a function of a comparison between the equivalent transmissivity spectrum and the at least one equivalent transmissivity; generating an initial fractured reservoir model based on the at least one fracture property, matching the initial fractured reservoir model by varying the at least one fractured property within the modified range of variation of each well that is chosen to minimize a difference between the well test data which is measured and data which is simulated with the fractured reservoir model and a flow simulator; generating a plurality of possible exploitation schemes based on the initial fractured reservoir model and the flow simulator to generate a plurality of possible exploitation schemes with each generated possible exploitation scheme providing a possible well configuration for placing at least one of a production well and an injection well into the fractured reservoir medium; predicting performance of each of the generated possible exploitation schemes for producing the hydrocarbons from the fractured subterranean medium; based on the predicted performances of the predicted exploitation schemes; choosing one of the generated possible exploitation schemes and drilling at least one of a production well and an injection well into the fractured reservoir medium in accordance with the chosen exploitation scheme; and exploiting the fractured subterranean medium with the chosen exploitation scheme to produce the hydrocarbons from the fractured subterranean medium.

The invention also relates to a computer program product downloadable from a communication network and/or stored on a tangible data storage medium readable by a computer and/or executable by a processor. This program comprises program code instructions for the implementation of the method as described above, when the program is executed on a computer.

The invention claimed is:

1. A method for exploiting a fractured subterranean medium to produce hydrocarbons from the fractured medium which uses a fractured reservoir model including a set of meshes discretizing the fractured reservoir medium, the fractures of the subterranean medium being characterized by at least one fracture property, for which a range of variation of the at least on fracture property is defined, at least two wells passing through the subterranean medium and determining at least one equivalent transmissivity from well test data for each well comprising:
  constructing an equivalent transmissivity model for each well which links the at least one equivalent transmissivity for each well to the at least one fracture property;
  using at least one transmissivity model and the range of variation of the at least one fracture property to estimate an equivalent transmissivity spectrum for each well;
  choosing at least one well for which the at least one equivalent transmissivity lies within the equivalent spectrum and modifying the range of variation of the at least one fracture property as a function of a comparison between the equivalent transmissivity spectrum and the at least one equivalent transmissivity;
  generating an initial fractured reservoir model based on the at least one fracture property, matching the initial fractured reservoir model by varying the at least one fractured property within the modified range of variation of each well that is chosen to minimize a difference between the well test data which is measured and data which is simulated with the fractured reservoir model and a flow simulator;

generating a plurality of possible exploitation schemes based on the initial fractured reservoir model and the flow simulator to generate a plurality of possible exploitation schemes with each generated possible exploitation scheme providing a possible well configuration for placing at least one of a production well and an injection well into the fractured reservoir medium;

predicting performance of each of the generated possible exploitation schemes for producing the hydrocarbons from the fractured subterranean medium;

based on the predicted performances of the predicted exploitation schemes;

choosing one of the generated possible exploitation schemes and drilling at least one of a production well and an injection well into the fractured reservoir medium in accordance with the chosen exploitation scheme; and exploiting the fractured subterranean medium with the chosen exploitation scheme to produce the hydrocarbons from the fractured subterranean medium.

2. A method according to claim 1, comprising:
varying the property within the modified range of variation to match the initial fractured reservoir model.

3. A method according to claim 1, comprising:
choosing the at least one fracture property from an average fracture density, an average fracture conductivity, an average fracture opening, an average fracture length, an average height and an average fracture orientation.

4. A method according to claim 1, wherein:
the fractured reservoir medium comprises cells, facies and zones and the at least one fracture property varies for each cell of the fractured reservoir model, for each facies or for each zone of the subterranean medium.

5. A method according to claim 1, wherein:
the equivalent transmissivity model is an analytical model.

6. A method according to claim 5, wherein the analytical equivalent transmissivity model is written in a formula comprising: $KH^S=C_0[1+\alpha_1 \cdot \theta_{d,1}]^{\omega(1,1)} \cdot [1+\beta_1 \cdot \theta_{c,1}]^{\omega(1,2)} \ldots [1+\alpha_S \cdot \theta_{d,S}]^{\omega(S,1)} \cdot [1+\beta_S \cdot \theta_{c,S}]^{\omega(S,2)}$ with S being a number of fracture families under consideration, $\theta d,j$ and $\theta c,j$ being normalized properties associated with a density conductivity of the fracture family j, $\alpha j$ and $\omega(j,1)$ are weighting coefficients representing a contribution of density of the fracture family j to an estimate of the equivalent transmissivity KH, $\beta j$ and $\omega(j,2)$ are weighting coefficients representing a contribution to conductivity of the fracture family j to an estimate of KH, and C0 is a corrective coefficient which is independent of the fracture properties.

7. A method according to claim 1, comprising:
generating the initial fractured reservoir model by using a property determined by each equivalent transmissivity model.

8. A method according to claim 1, comprising:
defining the range of variation of the at least one property by measuring the fractured subterranean medium and determining uncertainties related to the measuring.

9. A method according to one claim 1, comprising:
matching the fractured reservoir model by minimizing respectively differences between measured dynamic data of the fractured subterranean medium and simulated dynamic data and between measured equivalent transmissivities and simulated equivalent transmissivities.

10. A method according to claim 1 comprising:
using at least the matched fractured reservoir model during the exploitation scheme for determining at least one of placement of at least one of the production and the injection wells, fluids to be used during exploitation of fluids from the wells, target values for flow rates of fluids into the wells or fluids to be recovered from the wells in the reservoir, and tools to be used.

11. A method according to claim 2 comprising:
using at least the matched fractured reservoir model during the exploitation scheme for determining at least one of placement of at least one of the production and the injection wells, fluids to be used during exploitation of fluids from the wells, target values for flow rates of fluids into the wells or fluids to be recovered from the wells in the reservoir, and tools to be used.

12. A method according to claim 3 comprising:
using at least the matched fractured reservoir model during the exploitation scheme for determining at least one of placement of at least one of the production and the injection wells, fluids to be used during exploitation of fluids from the wells, target values for flow rates of fluids into the wells or fluids to be recovered from the wells in the reservoir, and tools to be used.

13. A method according to claim 4 comprising:
using at least the matched fractured reservoir model during the exploitation scheme for determining at least one of placement of at least one of the production and the injection wells, fluids to be used during exploitation of fluids from the wells, target values for flow rates of fluids into the wells or fluids to be recovered from the wells in the reservoir, and tools to be used.

14. A method according to claim 5 comprising:
using at least the matched fractured reservoir model during the exploitation scheme for determining at least one of placement of at least one of the production and the injection wells, fluids to be used during exploitation of fluids from the wells, target values for flow rates of fluids into the wells or fluids to be recovered from the wells in the reservoir, and tools to be used.

15. A method according to claim 6 comprising:
using at least the matched fractured reservoir model during the exploitation scheme for determining at least one of placement of at least one of the production and the injection wells, fluids to be used during exploitation of fluids from the wells, target values for flow rates of fluids into the wells or fluids to be recovered from the wells in the reservoir, and tools to be used.

16. A method according to claim 7 comprising:
using at least the matched fractured reservoir model during the exploitation scheme for determining at least one of placement of at least one of the production and the injection wells, fluids to be used during exploitation of fluids from the wells, target values for flow rates of fluids into the wells or fluids to be recovered from the wells in the reservoir, and tools to be used.

17. A method according to claim 8 comprising:
using at least the matched fractured reservoir model during the exploitation scheme for determining at least one of placement of at least one of the production and the injection wells, fluids to be used during exploitation of fluids from the wells, target values for flow rates of fluids into the wells or fluids to be recovered from the wells in the reservoir, and tools to be used.

18. A method according to claim 9 comprising:
using at least the matched fractured reservoir model during the exploitation scheme for determining at least one of placement of at least one of the production and the injection wells, fluids to be used during exploitation of fluids from the wells, target values for flow rates of fluids into the wells or fluids to be recovered from the wells in the reservoir, and tools to be used.

\* \* \* \* \*